3,679,506
TRANSFER COATING PROCESS
Anthony Joseph Burgess, Alan Charles Eagles, and Margaret Lillian Steel, Runcorn, England, assignors to Imperial Chemical Industries Limited, London, England
No Drawing. Filed May 26, 1969, Ser. No. 827,967
Claims priority, application Great Britain, June 11, 1968, 27,779/68; Aug. 16, 1968, 39,267/68
Int. Cl. B31f 00/00; B32b 31/00; B44c 00/00
U.S. Cl. 156—209                                    15 Claims

ABSTRACT OF THE DISCLOSURE

A process for the production of a painted planar polymeric article which comprises pressing an advancing band of thermoplastic polymeric material the surface of which is in heat softened form against a paint releasing substrate moving in the same direction and at the same speed as said band and to which has been applied a fluid paint coating and substantially dried, maintaining contact between the advancing band and the moving painted substrate for sufficient distance to effect transfer of the paint coating from the substrate to the band and thereafter parting the band from the substrate, and causing or allowing the surface of the thermoplastic polymeric material to cool below the softening point of the thermoplastic polymeric material during or after its contact with the painted substrate.

---

This invention relates to a continuous process for the production of planar articles of natural or synthetic polymers, which articles have a painted surface.

According to the present invention we provide a process for the production of painted, planar polymeric articles which comprises pressing an advancing band of thermoplastic polymeric material the surface of which is in heat softened form against a substrate moving in the same direction and at the same speed as said band and to which has been applied a paint coating, maintaining contact between the advancing band and the moving painted substrate for sufficient distance to effect transfer of the paint coating from the substrate to the band and thereafter parting the band from the substrate, and causing or allowing the surface of the thermoplastic polymeric material to cool below the softening point of the thermoplastic polymeric material during or after its contact with the painted substrate.

By means of our process we are able to produce a band of thermoplastic polymeric material the surface of which carries a well-keyed paint coating.

The term paint, as used throughout the specification, carries the normal meaning of a composition comprising a pigment dispersed in a film-forming medium.

Our invention find particular utility in the production of painted sheets and films. It is especially suitable for applying paint to extruded sheets and films although it may also be applied to films and sheets manufactured by other techniques such as calendering. It is prefrred to press the sheet or film against the moving painted substrate while the former is still in the heat softened state after issuing from the die of the extruder or from the calender, for example. However, if the sheet or film has cooled below the softening point of the polymeric material before it is pressed against the painted moving substrate, it should be reheated either before it is pressed against the painted substrate or while it is in contact with the substrate.

The substrate bearing the paint coating which is to be transferred to the band of thermoplastic polymeric material may be, for example, a roller, an endless belt, or a tape or ribbon or the like which may be wound from one reel onto another. The paint receiving surface of the substrate may be polished or matt as desired but, especially in the case of matt surfaces, it may be found desirable to provide a release layer between the surface and the paint coating. The surface of the substrate may comprise, for example, silicone rubber, a release paper or poly(ethylene terephthalate) film.

The nature of the paint is not critical. For example the film forming medium of the paint may be a natural or synthetic material, e.g. a polymeric material in solution or dispersion in an inert diluent or in a polymerisable material. Alternatively it may be a polymerisable material either alone or in a solution in an inert diluent. Mixtures may also be used. The paint may also include plasticisers, extenders, drying oils and other components well known in the art of paint technology.

The paint composition may be e.g. oil based or water based. Examples of suitable paints for application in the process of our invention include those in which the film forming component is based on cellulosic materials, acrylics, alkyds, polyurethanes and vinyl acetate and vinyl chloride polymers.

Polymeric materials from which the band of thermoplastic material may be formed include, for example, polyolefins e.g. polymers or copolymers of ethylene, propylene and/or 4-methyl pentene-1, polymers of vinyl chloride, vinylidene chloride, methyl methacrylate, styrene or acrylonitrile, and copolymers thereof with each other and/or with one or more other ethylenically unsaturated monomers, e.g. an acrylonitrile/butadiene/styrene copolymer; and polymeric blends e.g. blends of acrylonitrile/butadiene/styrene copolymers with e.g. polycarbonates or vinyl chloride polymers. Polyamides and polyesters may also be used.

In a preferred embodiment of our invention the paint coating on the surface of the moving substrate is formed from a matt paint and the polymeric material is a polyolefin.

By matt paint we mean a paint which when applied to a planar surface by normal painting techniques provides a surface from which specular reflected light is scattered diffusely and not substantially at an angle as would be the case for gloss paints which act as if the surface was a mirror.

Excellent results have been obtained wtih matt paints in which the film forming component of the paint comprises a vinyl acetate polymer or an acrylic polymer. Polyolefins which are particularly suitable include poly(ethylene), poly(propylene) and poly(4-methyl pentene-1).

Polyolefins directly painted by normal painting techniques are provided with only weakly bonded paint coatings. However, polyolefins which are painted by the process of our invention are provided with well-keyed paint coatings and are particularly suitable for repainting with a variety of different types of paint to give different types of finishes. Painted planar polyolefin articles which are thus repainted are also provided with a well-keyed paint coating.

Thus, according to a further embodiment of our invention we provide a planar article of a polyolefin to at least part of the surface of which there has been applied an adherent coating of a matt paint by pressing said surface in heat softened form against a substrate coated with said paint to transfer said paint coating to the article. The adhesive bond between the paint coating and the surface of the thus painted planar article of a polyolefin is such that on application of a strip of adhesive tape to the paint coating and removal therefrom by a rapid snatching action, no paint is removed. The strength of the adhesive bond when measured on a Type E Tensometer at a separation rate of ¼ inch per minute may be greater than 50 lb./sq. in.

The process of our invention may also be used to paint planar articles formed from acrylonitrile/butadiene/styrene copolymers. Very suitably, the film forming component of the paint is a vinyl chloride polymer or an acrylic polymer. Sheets of acrylonitrile/butadiene/styrene copolymer which are thus painted are particularly suitable for further shaping, e.g. by vacuum forming, without causing substantial damage to the paint coating even with deep draw.

In accordance with yet another embodiment of our invention we provide a planar article of an acrylonitrile/butadiene/styrene copolymer to at least part of the surface of which has been applied an adherent coating of a paint based on a vinyl chloride polymer or an acrylic polymer by pressing said surface in heat softened form against a substrate coated with said paint to transfer said paint coating to the article.

In accordance with the general process of our invention, the advancing band of thermoplastic polymeric material is pressed while the surface thereof is in heat softened form, against the painted substrate, maintained in contact with the painted substrate over a sufficient distance to effect transfer of the paint coating, and thereafter parted from the substrate, and the surface of the polymeric material is caused or allowed to cool below its softening point during or after contact with the painted substrate.

Conveniently, the pressure may be applied by passing the band and the painted substrate between one or more pairs of co-operating rollers and one or more of the rollers may be heated, if desired, to heat the band above the softening point of the polymeric material and/or to maintain it above the softening point. Where a series of co-operating rollers are used, the temperature of one or more of the rollers at the tail of the series of rollers may be controlled, if desired, to cool the surface of the band below the softening point of the polymeric material.

Suitably, one or more of the rollers may provide the substrate surface bearing the coating of paint to be transferred to the band, in which case the band may be pressed against the painted surface thereof by means of at least one other roller co-operating therewith. In such a case, or where the substrate is an endless belt, the paint may be applied thereto at a point in its travel before the substrate comes into contact with the band. Where this embodiment is used, it is preferred, but not essential, that the paint has dried on the substrate before it comes into contact with the band. In cases where it is not fully dried, it is at least desirable to ensure that any volatile diluent used in the paint composition is substantially evaporated and it is further preferred that the paint is fully dried before the band is subsequently parted from the substrate in order to facilitate handling of the painted band so produced.

Where the substrate is a tape or ribbon or the like which is being wound off one reel and onto another, for example, a pre-painted tape or ribbon may be used or the tape or ribbon may be painted at a point in the travel before it comes into contact with the band, as described above.

The paint coating may be applied to the surface of the moving substrate by any of the techniques normally used in paint application, e.g. electrostatic spraying, compressed air spraying, brushing, dipping, weir, doctor and air knife coating, and dry spraying.

It is preferred that the surface of the polymeric material of which the band is formed is below the softening point of the polymeric material when it is parted from the substrate. Where the surface of the polymeric material is still soft, care must be taken to avoid permanently deforming the band or damaging the paint coating whilst parting the band from the substrate.

The process may be used in general to apply any desired paint coating to any thermoplastic polymeric material provided that the paint and polymeric material are compatible and that, for example, the paint is not degraded or discoloured at the temperature prevailing during the transfer operation.

The process may be operated to coat one or both surfaces of the band, as desired, and the surfaces may be coated simultaneously or consecutively. Conveniently, the band may be passed between a pair of co-operating painted rollers.

If desired, the process of our invention may be adapted to impart a decorative effect to the band. For example, patterns may be applied by use of substrates to which the paint has been applied in patterned form. Alternatively or additionally, painted substrates may be embossed or may be passed in contact with the band through embossed rollers.

In another embodiment, two or more painted substrates may be used simultaneously or consecutively e.g. in register with different portions of the band of polymeric material, for example, across the width thereof.

It will be appreciated that the nature of the surface finish on the moving substrate to which the paint is applied will determine the nature of the finish of the paint coating on the polymeric shaped article after parting from the substrate since the exposed paint surface on the shaped article is that which was initially in contact with the surface of the substrate. Thus, any imperfections in the paint coating as applied to the substrate, e.g. brush marks or runs caused during brushing or spraying, will be hidden and will be absent from the visible paint surface on the painted article.

We have even found that when transferring a matt paint coating onto a polymeric material from a very smooth surface on a moving substrate, e.g. a poly(ethylene terephthalate) film, the surface of the paint coating on the polymeric material may be of a glossy, reflective finish.

It will also be appreciated that this method of application of a paint coating to the surface of a polymeric planar article may be operated to provide a stoved finish without the necessity of exposing the thermoplastic polymeric material to a stoving operation.

The painted planar article produced by the process of our invention may subsequently be painted and repainted in conventional manner. Thus, if the paint coating applied by the process of our invention is scratched or otherwise marked, it may readily be repainted by conventional means.

Our invention provides sheets or films of thermoplastic polymeric material having a painted surface whereon the paint is well-keyed to the polymeric material. In many cases, the painted products may thereafter be shaped e.g. by pressing or vacuum forming to provide pre-painted shaped parts e.g. for domestic appliances, for vehicles or for building.

In a modification of our invention, the moving band of thermoplastic polymeric material may be replaced by an advancing series of planar polymeric articles.

The invention is now illustrated by the following examples.

EXAMPLE 1

A sample of polypropylene melting at about 170° C. was extruded in a Peco 25 Extruder through a slit die to give a sheet 0.1 inch thick and 18 inches wide. The sheet issued from the die at a rate of 7 inches per minute and was passed into the nip between the top and middle rollers of a vertically disposed stack of three co-operating chromium plated steel rollers, each having a diameter of 10 inches. The rollers were each rotated with a peripheral speed of 7 inches per minute and were steam heated. A tape of silicon rubber reinforced with glass cloth which had previously been spray painted with a white vinyl acetate polymer emulsion paint and allowed to dry was fed into the nip between the top and middle rollers with the painted surface in contact with the polymeric extrudate. The extrudate and painted tape of silicon rubber were passed around the middle roller, back through the nip between the middle and bottom rollers and then around the bottom roller. The temperature of the polymer was 210° C. at the die of the extruder, 160° C. after passing through the nip between the top and middle rollers, 140° C. immediately before the nip between the middle and bottom rollers, and 120° C. after passing through the nip between the middle and bottom rollers.

The extrudate and painted silicon rubber tape were then passed between a pair of co-operating rollers after which the tape was parted from the extrudate leaving a white matt paint coating on the polymer sheet. A sample length of the painted sheet was cut off for testing.

Adhesion tests were carried out on ten samples of approximately ½ inch by ½ inch which were cut from the painted polypropylene sheet and to each of which a screw head of approximately 3/16 inch diameter was attached using an epoxy adhesive, sold under the name "Araldite" HV100–AV100 (Ciba Ltd.). When the adhesive had fully set after heating for 3 hours at 60° C., the polypropylene sheet and the screw head were clamped in a Type E Tensometer and separated from each other at a rate of ¼ inch per minute to measure the strength of the bond between the paint and the polypropylene. The average bond strength of the samples tested was 250 lb./sq. in.

In a further experiment the above procedure was repeated except that the silicone rubber tape was parted from the polymer sheet after passing around the bottom roller of the vertically disposed stack of three rollers and before the sheet had passed through the co-operating rollers. Adhesion tests on the thus painted sheets gave substantially similar results.

By way of comparison a sheet of polypropylene was spray painted with the same vinyl acetate polymer emulsion paint and allowed to dry. Adhesion tests on samples cut from the sheet were carried out following the above procedure. The bond strength was never greater than 50 lb./sq. in. and in some cases the painted samples could not be tested as the paint coating was so readily removed from the sample that the latter could not be clamped in the Tensometer.

Similar results may be obtained using high or low density polyethylene or polystyrene in place of the polypropylene.

EXAMPLE 2

The procedure of Example 1 was repeated except that the tape of silicon rubber was replaced by a tape of silicon coated release paper (PT955 Jointine Products Ltd.) which had previously been spray painted with vinyl acetate polymer emulsion paint and allowed to dry. The silicon coated release paper and the polymer were parted after they had passed around the bottom roller of the vertically disposed stack of three rollers leaving a white matt paint coating on the polymer sheet.

Adhesive tape (Sellotape) was applied to the paint coating on the sheet and removed with a rapid snatching action. The paint coating was not removed from the sheet.

In a further experiment the polymer sheet having a white matt paint coating produced by the above procedure was brush painted with an acrylic gloss paint and allowed to dry. When the adhesive tape testing procedure was repeated the paint coating was not removed from the sheet.

By way of comparison a sheet of polypropylene was brush painted with the same vinyl acetate polymer emulsion paint and allowed to dry. When adhesive tape (Sellotape) was applied to the paint coating on the sheet and removed with a rapid snatching action not only was the paint coating immediately under the adhesive tape removed from the sheet, but some paint from surrounding areas was removed.

Similar results were obtained using a type of silicon coated release paper sold as Multithane 6/3 by Wiggen Teape Ltd.

EXAMPLE 3

The procedure of Example 1 was repeated except that the tape of silicon rubber was replaced by a 0.002 inch thick tape of poly(ethylene terephthalate) (ICI Ltd.) which had previously been painted with vinyl acetate polymer emulsion paint and allowed to dry. When the poly(ethylene terephthalate) tape and the polymer sheet were parted the polymer sheet was found to have a smooth white paint coating having a gloss finish.

The adhesive tape testing procedure of Example 2 was repeated with similar results. Similar results were obtained using a vinyl acetate polymer emulsion paint containing 90% of $TiO_2$ pigment by weight of the total solids in the paint.

EXAMPLE 4

When the procedure of the preceding examples was repeated using a water-based acrylic under-coat paint in place of the vinyl acetate polymer emulsion paint, adhesive tape tests of the thus painted polymer sheets gave substantially similar results.

By way of comparison adhesive tape tests on a polypropylene sheet brush painted with a water-based acrylic under-coat paint indicated that the paint coating was very weakly bonded to the polymer sheet.

EXAMPLE 5

A sample of acrylonitrile/butadiene/styrene copolymer was extruded through a slit die following the procedure of Example 1. A coating of vinyl chloride polymer based paint which had previously been applied by spraying on to a tape of silicone coated release paper of the type used in Example 2 and then allowed to dry was transferred to the extruded polymer sheet following the procedure of Example 1. The temperature of the polymer was 150° C. after passing through the nip between the top and middle rollers, 120° C. immediately before the nip between the middle and bottom rollers, and 110° C. after passing through the nip between the middle and bottom rollers. Parting of the polymer sheet and the tape of silicon coated release paper left a white paint coating adhering to the polymer sheet.

Similar results were obtained using a water based acrylic under-coat paint and an acrylic gloss paint in place of the vinyl chloride polymer based paint.

EXAMPLE 6

The procedure of Example 5 was repeated except that a glass reinforced silicone rubber tape was used in place of the silicone coated release paper. Parting the tape from the polymer sheet left a white paint coating on the polymer sheet.

Adhesion tests carried out following the procedure of Example 1 indicated that the bond strength between the paint coating and the polymer sheet was in excess of 1300 lb./sq. in., failure occuring at the interface between the adhesive and the paint coating and not at the polymer/paint interface.

A 12 inch by 12 inch sheet of the painted polymer was vacuum formed into a dome shaped article in which the dome was 7 inches deep and the base of the dome was 5 inches in diameter without loss of adhesion or cracking of the paint coating on the surface of the polymer.

EXAMPLE 7

The procedure of Example 5 was repeated except that a silicone coated release paper of the type used in Example 3 was used.

A polymer sheet having a white paint coating produced which was not removed by the adhesive tape test following the procedure of Example 2.

EXAMPLE 8

An acrylonitrile/butadiene/styrene polymer sheet was extruded and passed into the nip between the top and middle rollers of a vertically disposed stack of three co-operating chromium plated steel rollers following the procedure of Example 5. The surface of the top roller was continually spray painted with a white vinyl chloride polymer based paint at the top point of its travel. The sheet of polymer was passed around the middle and bottom rollers and when removed from the bottom roller was found to have a white paint coating which could not be removed by application of the adhesive tape test of Example 2.

EXAMPLE 9

The procedure of Example 5 was repeated except that an unpainted tape of silicone coated release paper which was passed round the top roller and then into the nip between the top and middle rollers was spray painted immediately before contacting the roller.

Parting of the silicone coated release paper and the polymer sheet revealed a white matt paint coating on the polymer sheet which could not be removed by application of the adhesive tape test of Example 2.

EXAMPLE 10

The procedure of Example 5 was repeated except that the silicone coated release paper had previously been painted with a vinyl acetate polymer emulsion paint.

Parting of the silicone coated release paper and the polymer sheet revealed a white paint coating on the polymer sheet.

What we claim is:

1. A process for the production of a painted planar polymeric article which comprises pressing an advancing band of polyolefin material the surface of which is in the heat softened form against a paint releasing substrate moving in the same direction and at the same speed as said band and to which has been applied a fluid paint coating, maintaining contact between the advancing heat softened band and the substantially dry paint coating on said moving painted substrate for sufficient distance to effect transfer of the paint coating from the substrate to the band thereafter parting the band from the substrate, and causing or allowing the surface of the polyolefin material to cool below its softening point before said parting.

2. A process as claimed in claim 1 in which the band is produced by extrusion.

3. A process as claimed in claim 1 in which the substrate is an endless belt, or a tape or ribbon and the band is pressed against the painted surface of the substrate by passing the band and substrate between one or more pairs of co-operating rollers.

4. A process as claimed in claim 1 in which the substrate is a roller and the band is pressed against the painted surface thereof by means of at least one other roller co-operating therewith.

5. A process as claimed in claim 1 in which the surface of the substrate comprises silicon rubber, poly(ethylene terephthalate) film or release paper.

6. A process as claimed in claim 1 in which the paint receiving surface of the substrate is provided with a release layer between said surface and the paint coating.

7. A process as claimed in claim 1 in which the paint is applied to the substrate at a point in the travel thereof before it comes into contact with the band.

8. A process as claimed in claim 1 in which the paint coating is applied to both sides of the band.

9. A process as claimed in claim 1 in which the paint coating is applied to the substrate in the form of a decoration.

10. A process as claimed in claim 1 in which the painted substrate is embossed or is passed in contact with the band between embossed rollers.

11. A process as claimed in claim 1 in which two or more painted substrates are used simultaneously or consecutively.

12. A process as claimed in claim 1 in which the paint coating is formed from a matt paint.

13. A process as claimed in claim 1 in which the film forming component of the paint comprises a material selected from the group consisting of a vinyl acetate polymer and an acrylic polymer.

14. A process as claimed in claim 1 in which the polyolefin is selected from the group consisting of poly(ethylene), poly(propylene) and poly(4-methyl pentene-1).

15. A process for the production of a planar article of a polyolefin at least part of the surface of which has a strongly adherent coating of a paint which comprises pressing said surface in heat softened form against a substrate coated with a matt paint to transfer said matt paint coating to said article.

References Cited

UNITED STATES PATENTS

| | | | |
|---|---|---|---|
| 2,501,539 | 3/1950 | Ruth | 156—542 |
| 2,559,649 | 7/1951 | Little et al. | 156—238 X |
| 3,010,861 | 11/1961 | Reese | 156—238 X |
| 3,067,056 | 12/1962 | Remer | 117—138.82 |
| 3,108,899 | 10/1963 | Reindl et al. | 161—253 X |

ROBERT F. BURNETT, Primary Examiner

C. B. COSBY, Assistant Examiner

U.S. Cl. X.R.

117—112, 138.82; 156—238, 244, 243, 246, 219, 249; 161—25